(12) United States Patent  
Ingman et al.

(10) Patent No.: US 7,162,138 B2  
(45) Date of Patent: Jan. 9, 2007

(54) OPTICAL FIBER WITH NANO-PARTICLE OVERCLAD

(75) Inventors: Dov Ingman, Haifa (IL); Ephraim Suhir, Los Altos, CA (US)

(73) Assignee: ERS Company, Los Altos, CA (US)

( * ) Notice: Subject to any disclaimer, the term of this patent is extended or adjusted under 35 U.S.C. 154(b) by 24 days.

(21) Appl. No.: 11/230,476

(22) Filed: Sep. 21, 2005

(65) Prior Publication Data

US 2006/0013550 A1    Jan. 19, 2006

Related U.S. Application Data

(63) Continuation of application No. 09/884,463, filed on Jun. 20, 2001.

(51) Int. Cl.  
*G02B 6/00* (2006.01)

(52) U.S. Cl. ..................... 385/144; 385/141

(58) Field of Classification Search .............. None  
See application file for complete search history.

(56) References Cited

U.S. PATENT DOCUMENTS

| | | | | |
|---|---|---|---|---|
| 4,035,210 A | * | 7/1977 | Ohyoshi et al. | 216/24 |
| 4,275,118 A | * | 6/1981 | Baney et al. | 428/412 |
| 4,675,040 A | * | 6/1987 | Tanaka et al. | 65/391 |
| 4,705,571 A | * | 11/1987 | Lange et al. | 106/287.1 |
| 5,371,824 A | * | 12/1994 | Parris et al. | 385/109 |
| 6,911,258 B1 | * | 6/2005 | Prigent et al. | 428/372 |
| 2002/0118933 A1 | * | 8/2002 | Dixon et al. | 385/109 |

FOREIGN PATENT DOCUMENTS

JP        62086311 A   *   4/1987

* cited by examiner

*Primary Examiner*—Sung Pak  
(74) *Attorney, Agent, or Firm*—Bardmesser Law Group

(57) ABSTRACT

An optical fiber includes a core, a cladding layer, and an overclad layer that has a plurality of nano-particles the core.

13 Claims, 5 Drawing Sheets

OPTICAL FIBER WITH NANO-PARTICLE OVERCLAD

CROSS-REFERENCE TO RELATED APPLICATIONS

This application is a continuation of U.S. patent application Ser. No. 09/884,463, filed on Jun. 20, 2001, entitled OPTICAL FIBER WITH NANO-PARTICLE CLADDING, which is incorporated by reference herein in its entirety.

BACKGROUND OF THE INVENTION

1. Field of the Invention

This invention is related to optical fibers, and more particularly, to optical fibers with an overclad layer having a low Young's modulus and high water repellency characteristics.

2. Discussion of the Related Art

In the last several decades, fiber optic communication has become ubiquitous. Fiber optic manufacturing technology has matured, and millions of miles of fiber have been laid all over the world, connecting a variety of communication devices. An optical fiber operates by transmitting coherent light, such as light from a modulated laser diode, down its glass core. The cladding, which is around the glass core, has a lower refractive index than the core, allowing light from the laser diode to propagate down the core. Around the cladding of a conventional fiber is the overclad.

The cladding has to perform a number of functions. One purpose of having the cladding around the glass core is to protect the fiber core from various environmental hazards, such as water penetration, or from micro-cracking, which degrades the performance of the fiber, and therefore degrades the transmission properties of the entire fiber optic system. The cladding protects the fiber from moisture and from potential humidity penetration through the cladding, since such moisture penetration can generate defects in the fiber, particularly when mechanical stresses are applied to the fiber. These mechanical stresses can include tensile stress, bending, and twisting of the fiber as the fiber is laid. It is therefore desirable to have a cladding with as low a Young's modulus as possible, to enable the fiber to be as flexible as possible. At the same time, it is desirable to have a cladding that is hydrophobic, so that moisture and water do not penetrate the cladding into the fiber core.

The function of the overcladding is mechanical protection of the fiber core from external impacts and hazards, while the primary function of the cladding is optical (i.e., providing a medium of a lower index of refraction than the fiber core).

Silica glass is by far the best fiber optic material today. Silica glass is frequently used as both the fiber core material (often in the form of doped silica), as well as for cladding (as "regular" silica, or undoped silica). Silica glass is also often used as the "overcladding" material. However, silica glass, despite its widespread use, suffers from a number of disadvantages. One major disadvantage is insufficient fracture resistance (often referred to as "static fatigue," or a short time until delayed fracture appears after an appreciable thermal or mechanical load is applied to the fiber).

Another shortcoming of the silica glass material is moisture sensitivity, since even a very minute amount of moisture on the fiber surface can result in a sudden failure, particularly in the presence of surface micro-cracks. Yet another major shortcoming of the silica glass material is its inability to withstand appreciable deformations due to tension or bending.

In addition to the use of silica glass claddings, other coatings are applied to the fiber core and cladding. These include non-hermetic, or polymer, coatings; and hermetic (carbon or metal) coatings. Polymer coatings have an advantage in that they have fairly low Young's moduli, and are therefore able to withstand large tensile or bending deformations. Polymers, however, have a major disadvantage in that they absorb moisture. Thus, long-term reliability of a polymer-coated fiber is believed to be suspect. Hermetic coatings, (e.g., metallic coatings) on the other hand, provide good protection from moisture, but have a major disadvantage in being subject to corrosion, and fairly high Young's moduli, which results in poor performance when mechanical stress, such as bending or twisting, is applied. Phosphorous nickel, for example, has a Young's modulus that is approximately three times higher than the Young's modulus of silica glass. Due to its very high Young's modulus, it is not uncommon for the coating, rather than for the silica glass in the fiber core, to fail first, when subjected to mechanical loading.

Accordingly, there is a need for a cladding material that overcomes the disadvantages described above, i.e., in a material that has a low Young's modulus, has good mechanical stability, and at the same time is hermetic or hydrophobic, so as to prevent moisture from penetrating into the fiber.

SUMMARY OF THE INVENTION

Accordingly, the present invention is directed to an optical fiber with nano-particle cladding and a method for manufacturing same that substantially obviates one or more of the problems due to limitations and disadvantages of the related art.

An object of the present invention is to provide a fiber optic structure with a high resistance to water, high flexibility and increased efficiency.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a optical fiber including a core, and a cladding layer including a plurality of nano-particles around the core.

In another aspect of the present invention there is provided an optical fiber bundle including a plurality of cores, and a cladding layer including a plurality of nano-particles, wherein the plurality of cores are embedded within the same cladding layer.

In another aspect of the present invention there is provided an optical transmission structure including a substrate, a waveguide formed on the substrate, and a cladding layer including a plurality of nano-particles over the waveguide.

In another aspect of the present invention there is provided an optical transmission structure including a substrate, a plurality of waveguides formed on the substrate and a cladding layer including a plurality of nano-particles over the waveguides and between the waveguides.

In another aspect of the present invention there is provided a method of manufacturing a fiber structure including the steps of forming a fiber core, and coating a fiber core with a cladding layer that includes nano-particles.

In another aspect of the present invention there is provided a method of manufacturing a light transmission structure comprising the steps of forming a waveguide on a substrate, and coating the waveguide with a cladding layer that includes nano-particles.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

As an initial matter, it is desirable to have a fiber of small radius and low Young's modulus. This may be shown as follows.

Figure 1:
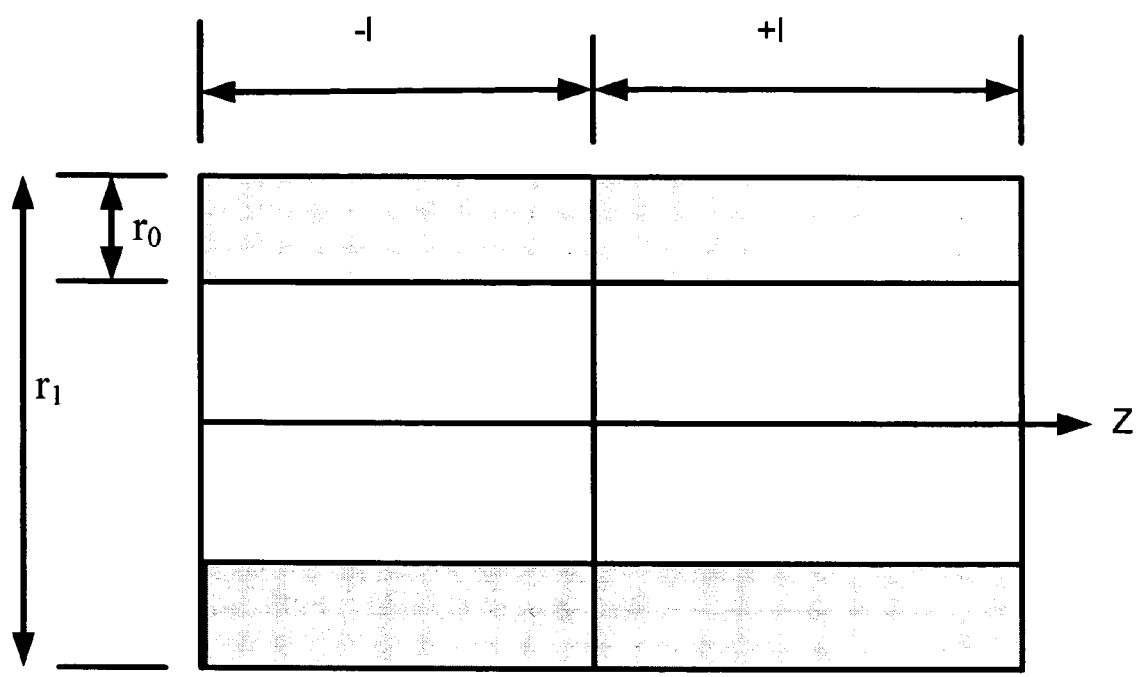
FIG. 1 is a schematic for purposes of quantitatively illustrating the advantages of small-radius high-Young's modulus structures.

In order to quantitatively assess the gain in terms of the induced stress that could be expected as a result of the application of a low-modulus, low CTE (coefficient of thermal expansion) and/or coating/cladding layer, consider a coated optical glass fiber, manufactured at an elevated temperature and subsequently cooled down to a low (for example, room temperature), such as that shown in cross-section in FIG. 1.

The longitudinal interfacial displacements, $u_0$ (z) and $u_1$ (z), of the glass fiber and its coating, respectively, can be, in an approximate analysis, expressed by the equations:

$$u_0(z) = -\alpha_0 \Delta t z + \lambda_0 \int_0^z T_0(z) dz - \kappa_0 \tau_0(z)$$ Equations (1)

-continued $$u_1(z) = -\alpha_1 \Delta t z + \lambda_1 \int_0^z T_0(z) dz - \kappa_1 \tau_0(z)$$

where $\alpha_0$ and $\alpha_1$ are the CTE of the glass and the coating/cladding materials, respectively, and $\Delta t$ is the change in temperature, $$\lambda_0 = \frac{1}{\pi E_0 r_0^2} \text{ and } \lambda_1 = \frac{1}{\pi E_1 (r_1^2 - r_0^2)}$$ Equation (2)

are the axial compliances of the glass and the coating, where $E_0$ and $E_1$ are Young's moduli of these materials, $r_0$ is the glass fiber radius; $r_1$ is the outer radius of the coating, $$T_0(z) = 2\pi r_0 \int_{-l}^{z} \tau_0(z) dz$$ Equation (3)

is the axial thermally induced force, $T_0$ (z) being the interfacial thermally induced stress, and l is half the fiber length, $$\kappa_0 = \frac{r_0}{E_0} \text{ and } \kappa_1 = \frac{r_0}{2E_1}\left[\frac{4(1+v_1)}{1-\gamma^2}\ln\sqrt{\frac{1+\gamma^2}{1-\gamma^2}} - 1\right]$$ Equation (4)

are the interfacial compliances of the glass and the coating, respectively, $\gamma = r_0/r_1$ is the radii ratio, $v_1$ is Poisson's ratio of the coating material.

The origin of the coordinate z is in the mid-cross-section of the fiber at its axis. The first terms in Equation (1) are stress-free (unrestricted) thermal contractions of the materials, the second terms are the displacements caused by the thermally induced forces $T_0$ (z). These are obtained on the basis of Hooke's law and reflect an assumption that the thermally induced displacement due to the forces $T_0$ (z) are the same for all the points of the given cross-section z of the given material. The third terms in Equation (1) are, in effect, corrections to the second terms. These corrections account for the fact that the given cross-section of the coated fiber does not remain flat, and that the interfacial (longitudinal) displacements are somewhat larger than the longitudinal displacements of the other points of the cross-section. The third term reflects an assumption that the correction in question can be found as the product of the interfacial compliance and the level of the interfacial shearing stress in the given cross-section and are not affected by the stresses and strains in the adjacent cross-sections.

The boundary condition $u_0$ (z)=$u_1$ (z) of the longitudinal interfacial displacements yields:

$$\kappa \tau_0(z) - \lambda \int_0^z T_0(z) dz = \Delta \alpha \Delta t z$$ Equation (5)

where $\kappa = \kappa_0 \kappa_1$ and $\lambda = \lambda_0 \lambda_1$ Equation (6)

are the total interfacial and the total axial compliances, respectively and $$\Delta \alpha = \alpha_1 - \alpha_0$$ Equation (7)

is the difference in the CTE of the coating and the glass. Differentiating Equation (5) with respect to the coordinate z, we have:

$$\kappa \tau_0'(z) - \lambda T_0(z) = \Delta \alpha \, \Delta t \quad \text{Equation (8)}$$

$$\text{Since } T_0(\pm l) = 0 \quad \text{Equation (9)}$$

the interfacial shearing stress function $\tau_0(z)$ should satisfy the boundary condition $$\tau_0'(l) = \frac{\Delta \alpha \, \Delta t}{\kappa} \quad \text{Equation (10)}$$

The next differentiation of equation (8) yields:

$$\tau_0''(l) - k^2 \tau_0(z) = 0 \quad \text{Equation (11)}$$

$$\text{where } k = \sqrt{2\pi r_0 \frac{\lambda}{\kappa}} \quad \text{Equation (12)}$$

is the parameter of the interfacial shearing stress. Equation (11) has the following solution:

$$\tau_0(z) = C_0 \sinh kz + C_1 \cosh kz \quad \text{Equation (13)}$$

The function of $\tau_0(z)$ must be anti-symmetric with respect to the mid-cross-section $z=0$ and therefore one should put $C_1=0$. As to the constant $C_0$, it can be determined from Equation (10) as follows:

$$C_0 = \frac{\Delta \alpha \, \Delta t}{k\kappa} = \frac{k}{2\pi r_0} \frac{\Delta \alpha \, \Delta t}{\lambda} \frac{1}{\cosh kl} \quad \text{Equation (14)}$$

$$\text{so that } \tau_0(z) = \frac{k}{2\pi r_0} \frac{\Delta \alpha \, \Delta t}{\lambda} \frac{\sinh kz}{\cosh kl} \quad \text{Equation (15)}$$

Introducing this solution into the formula (3) we obtain the following expression for the induced force $T_0(z)$:

$$T_0(z) = -\frac{\Delta \alpha \, \Delta t}{\lambda} \left( 1 - \frac{\sinh kz}{\cosh kl} \right) \quad \text{Equation (16)}$$

The maximum shearing stress occurs at $z = \pm l$, and the maximum thermally induced forces occur in the mid-portion of the coated fiber, and, based on Equations (15) and (16) are:

$$\tau_{max} = \frac{k}{2\pi r_0} \frac{\Delta \alpha \, \Delta t}{\lambda} \tanh kl \quad \text{Equation (17)}$$

$$T_{max} = -\frac{\Delta \alpha \, \Delta t}{\lambda} \left( 1 - \frac{1}{\cosh kl} \right)$$

For sufficiently long (large l values) and/or stiff (large radius) assemblies, these equations yield:

$$\tau_{max} = \frac{k}{2\pi r_0} \frac{\Delta \alpha \Delta t}{\lambda} \text{ and } T_{max} = -\frac{\Delta \alpha \Delta t}{\lambda} \quad \text{Equation (18)}$$

Considering Equations (2), (4) and (12), these Equations can be written as $$\tau_{max} = \frac{E_1 \Delta \alpha \Delta t}{\sqrt{\left( 2\frac{E_1}{E_0} + \frac{4(1+\nu_1)}{1-\gamma^2} \ln \sqrt{\frac{1+\gamma^2}{1-\gamma^2}} - 1 \right) \left( \frac{E_1}{E_0} - \frac{\gamma^2}{1-\gamma^2} \right)}} \quad \text{Equation (19)}$$

$$T_{max} = \frac{\pi E_1 r_0^2 \Delta \alpha \Delta t}{\frac{E_1}{E_0} + \frac{\gamma^2}{1-\gamma^2}} \quad \text{Equation (20)}$$

These equations indicate that both the shearing stress and the thermally induced force can be reduced substantially, if low Young's modules coating materials are used, as well as materials with good thermal match with the silica glass and low manufacturing temperature. Equations (19) and (20) indicate also that the induced stress and force decrease with a decrease in the thickness of the coating/cladding, i.e. the induced stresses and forces are smaller the closer the radii ratio are to one.

Figure 2:
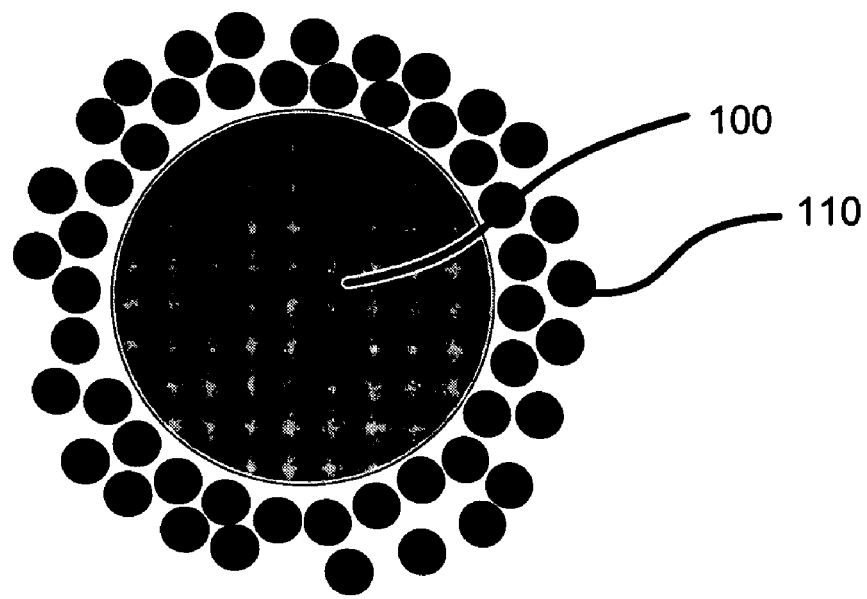
FIG. 2 illustrates one embodiment of the optical fiber of the present invention.

FIG. 2 illustrates one preferred embodiment of the present invention.

As may be seen from FIG. 2, a fiber core 100 is surrounded by a heterogeneous cladding layer 110, with the cladding layer 110 being comprised of very small nano-particles and, optionally, a liquid or semi-liquid filler. The filler may be, for example, poly-siloxane. Alternatively, any of a number of materials whose properties are stable over time may be used, such as, e.g., synthetic oils or lubricants, for example, chlorinated naphthalene that form a wax or oil. Such materials are used for condenser impregnation in moisture-, flame- and/or acid-proofing of wire and cable.

The filler can be either polymerizing or non-polymerizing. For example, a low-molecular weight polyethylene with different filler may be used. Such polyethylene materials are used for packing of nuclear equipment at 400 bar and 250° C. The density of the nano-particles within the filler affects its viscosity and its Young's modulus.

Due to the presence of the nano-particles in the cladding layer 110, the cladding layer 110 is substantially hydrophobic and thixotropic.

Thixotropy is a property exhibited by certain gels of becoming fluid when stirred or shaken, and then returning to semi-solid state when the stirring or shaking ends. Thus, there are gels that become liquid when shaken or stirred, but return to a semi-solid state when they are allowed to settle. These gels show thixotropy, or the property of fluidity under stress. Reverse thixotropy refers to a reconstruction of gel structure and liquid transforming to semi-solid state after the end of stress action. The semi-solid state remains for as long as the stress is less than critical level.

Due to its thixotropicity, the cladding material has a self-curing feature (or, more precisely, nano-particles form and repair the cladding layer due to a reverse thixotropy transformation). In other words, if micro-cracks or other defects develop under the surface of the cladding, then the thixotropic nature of the cladding will result in a filling of the cracks or defects with the cladding material. Given the size of the nano-particles (usually in the range of 5–150 nm in diameter, and typically approximately tens of nanometers in diameter), even very small defects or micro-cracks in the fiber core 100 can be self-cured, therefore preventing their propagation and growth. In one preferred embodiment, the nano-particles may be hydrophilic (for example, made of silica glass, although other types of glasses may be used), and the filler material is hydrophobic. The hydrophobicity is for protection from water and moisture, while the hydrophilicity is for trapping and expulsion of water and/or moisture that has already penetrated into the cladding layer 110.

Another option is the use of different types of nano-particles within the same filler material. One possibility of the use of hydrophobic silica particles in combination with alumina, ceramic or metallic oxide, for example, titanium oxide ($TiO_2$) particles. In fact, any metallic oxide (magnesium oxide, e.g.) can also be used as hydrophilic nano-solids.

Such a combination will have different viscoelastic properties from a cladding layer that only has one type of nano-particles (for example, only silica glass nano-particles). One of the advantages of the nano-particle cladding layer 110, as discussed above, lies in the fact that the cladding layer 110 of the present invention can act as both a cladding and a coating, with the nano-particles together with the filler functioning as both a cladding and a coating of a conventional fiber structure. The combination of metal, metal oxides and silica nano-particles allows getting the predetermined optical characteristics of the boundary between fiber core surface and covering. It improves an optical efficiency of fiber. The desired properties of contact layer may been achieved through thermal, electromagnetic or optical treatment.

Figure 5:
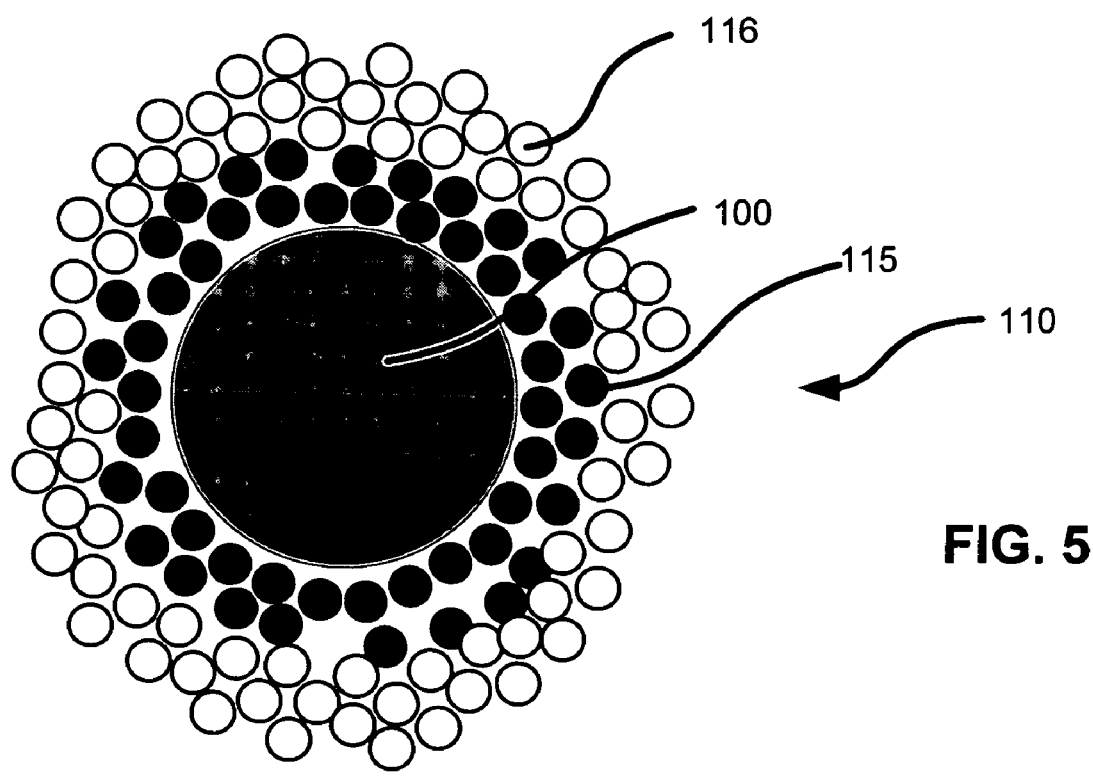
FIG. 5 illustrates yet another embodiment of the present invention with multiple layers of dissimilar nano-particles in the same cladding.

Another option is the use of two layers of dissimilar nano-particles within the same cladding layer 110, as illustrated in FIG. 5. The inner layer 115, close to the fiber core 100, may be comprised of hydrophilic metallic oxide nano-particles (or hydrophilic molybdenum disulfide), while the outer layer 116 may be comprised of hydrophobic silica nano-particles. Here, other possible materials for nano-particles include molybdenum disulfide for use as the inner layer 115 with good adhesion to the silica glass core surface and very small forces of friction. Hydrophobic particles of Teflon or other synthetics may be used as an outer layer 116. Alternatively, Teflon may be used as a filler itself. Water cannot enter to pores of hydrophobic materials if size of pore less 0.1 micron at pressure more 20.0 MPa. This allows use hydrophobic particles as filler while providing a very small contact surface in contact with the fiber core while preserving optimal properties of the cladding.

Additionally, the effective refractive index of the cladding layer 110 with the nano-particles (and using air for filler) can be close to 1, due to minimal contact area between the nano-particles and the fiber core 100.

Even if a polymer is used as the filler material, the refractive index of the polymer is less than the refractive index of the silica glass in the fiber core 100. Thus, a major advantage of the present invention is the ability to have a sufficient index of refraction difference between the fiber core 100 and the cladding layer 110 (such as when polymer-based claddings are used) without sacrificing the hydrophobic characteristics of the silica claddings found in conventional optical fibers. Alternatively, the filler may be air, with the nano-particles being closely spaced to each other. Thus, the index of refraction of such a cladding layer 110, which comprises primarily nano-particles themselves, is fairly close to unity, while the index of refraction of silica glass in the fiber core 100 is typically about 1.5–1.7.

The present approach allows a substantial simplification of the manufacturing process of making fibers. In conventional fibers, for example, the fiber core is frequently doped in order to increase its index of refraction, and particularly the difference in the index of refraction between the fiber core and the cladding material, so as to improve light propagation properties of the fiber. With the index of refraction of the cladding layer of the present invention, there is substantially less need to dope the fiber core 100 in order to increase its index of refraction.

Furthermore, there is no need for a separate overclad layer around the cladding, since the cladding material as described here can perform the functions of both the cladding and the overclad. (The overclad layer may still be optionally added, however, as discussed below.)

Figure 3:
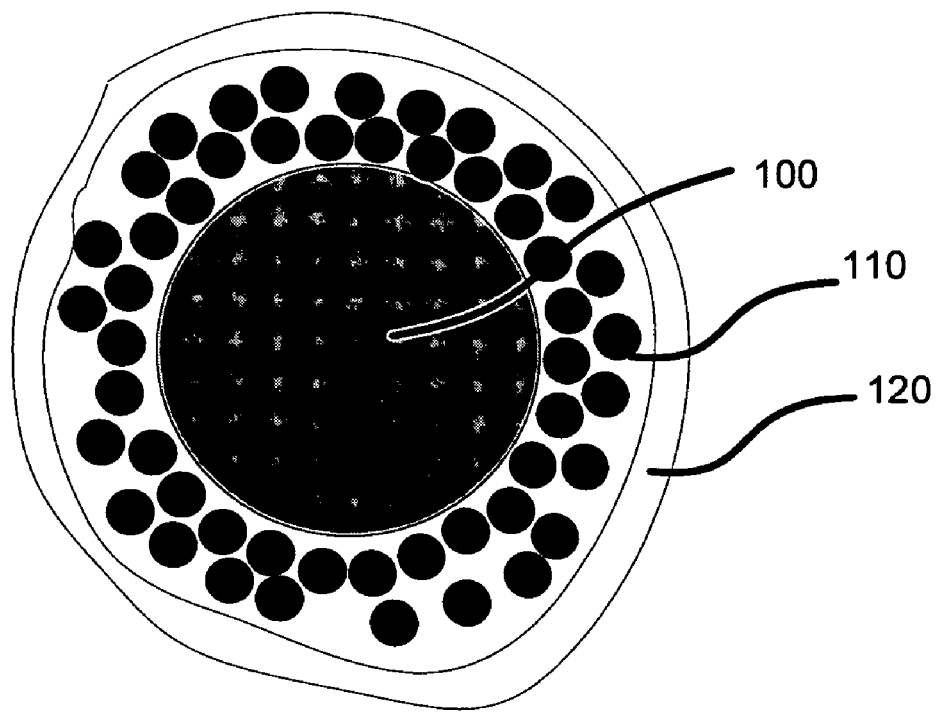
FIG. 3 illustrates another embodiment of the optical fiber of the present invention.

As illustrated in FIG. 3, the fiber core 100 is surrounded by nano-particles in the cladding layer 110, and is in turn optionally surrounded by a layer of an outer cladding 120 that comprises a highly viscose polymer (for example acetate polymers based on acetic acid (alpha or octyl-cyano-acrylates, chlorinated naphthalene and other compounds that are insoluble in water and acid solutions), or any of a number of polymers commonly used for protective overclad layer, e.g., BORDEN™.

As noted above, the cladding material is preferably heterogeneous, and includes inorganic solid nano-particles with a high Young's modulus, as well as (optionally) a liquid or a quasi-liquid inorganic filler. If the nano-particles are comprised of silica, they can be either hydrophilic (regular silica) or hydrophobic (modified silica, with methyl group $CH_3$ on its surface). The filler material is normally hydrophobic.

In another embodiment, an optical fiber core has a hydrophilic surface that is covered by "dry lubrication", for example, molybdenum disulfide and hydrophobic silica nano-particles over the molybdenum disulfide nano-particle layer. The molybdenum disulfide nano-particle layer forms a porous structure that may be protected by Teflon, polyethylene or other elastic cover. Teflon has an extremely low Young's modulus. In this case, Teflon creates a "sleeve" and does not fill the space between the nano-particles.

In another embodiment, an optical fiber core has hydrophobic surface that is covered by "dry lubrication", for example, molybdenum disulfide with nano-powder of aluminum and hydrophobic silica nano-particles. The molybdenum disulfide and silica nano-particles form a porous structure that may be protected by Teflon, polyethylene or other elastic covering. The structure therefore has the silica core in the center, and an outer "coating," with nano-particles which serve as both spacers (washers) between the fiber core 100 and the outer coating, and as "bearing rollers."

In another embodiment, an optical fiber core has a hydrophilic surface that is covered by resin foam with "dry lubrication," for example, molybdenum disulfide and hydrophobic silica nano-particles. Such resin foam may be created by cyano-acrylate and/or other adhesives with organic solvents and fillers (silica, aluminum, silver powder, etc.). This porous structure that may be protected by Teflon, polyethylene or other elastic covering.

In another embodiment, an optical fiber core has a hydrophilic surface that is covered by resin foam with "dry lubrication," for example, molybdenum disulfide and hydrophobic silica nano-particles. The resin foam may be created by evaporation of the adhesive organic solvents and may include nano-particles of silica, aluminum nano-powder, etc. This structure that may be protected by Teflon, polyethylene or other elastic covering.

In another embodiment, an optical fiber core has a hydrophobic surface that is covered by resin foam with "dry lubrication," for example, molybdenum disulfide and hydrophobic silica nano-particles. The resin foam may be created by evaporation of adhesive organic solvents and may include nano-particles of silica, aluminum powder, etc. This structure that may be protected by Teflon, polyethylene or other elastic covering. Evaporation may be accomplished by heating using, for example, high-frequency electromagnetic field.

An optical fiber core with hydrophobic or hydrophilic surface that is covered by resin foam with "dry lubrication", for example, molybdenum disulfide and hydrophobic silica nano-particles. Such foam may be created by gas release during the chemical reaction and polymerization of the adhesive that takes place surround of the fiber glass core surface. This structure that may be protected by Teflon, polyethylene or other elastic covering.

Alternatively, the resin foam may result from over-saturation by an inert or neutral gas of the organic solvent or mix before or during polymerization of the covering (coating). This structure that may be protected by Teflon, polyethylene or other elastic covering.

It is worth noting that hydrophobic nano-particles typically have a small adhesion to glass fiber surface and distribute along corn due to mutual repulsion of the similarly charged particles. The charging results of the interaction with filling and/or outer covering from Teflon, polyethylene or special adhesive compositions.

With the use of hydrophilic and hydrophobic silica nano-particles, in combination with a hydrophobic filler in the same cladding layer 110, a "smart" material may be formed. This is done by varying the combinations/percentages/types of the hydrophilic and hydrophobic nano-particles, in combination with the filler material that is always hydrophobic. Thus, the "smart material" may be hydrophobic enough to keep out the environmental moisture, and is at the same time hydrophilic enough to absorb and subsequently expel the already ingressed moisture. It is believed that a range of 20%–80% hydrophilic-hydrophobic to 80%–20% hydrophilic-hydrophobic is useful, more preferably a range of 40%–60% to 60%–40% hydrophilic-hydrophobic. As noted above, the viscoelastic properties of the heterogeneous smart material are determined, in part, by the density and nature of the nano-particles and the filler.

The smart material of the present invention has a very low Young's modulus, while at the same time having very high strain-at-failure characteristics, as well as a low coefficient of thermal expansion (CTE).

Additionally, the smart material of the present invention has very good adhesion to the adjacent material, i.e., to the material of the fiber core 100, which it covers and protects. Thus, the smart material can have a very long, practically unlimited, service life, since it is not prone to corrosion, aging, or crack and micro-crack initiation. The smart material of the present invention also possesses the highly desirable property of thixotropy. This results in the ability of the smart material to "self cure," i.e., to restore its properties when a micro-crack attempts to initiate due to external mechanical loads being applied to the structure. The smart material of the present invention is also able to "cure" the material that it coats i.e., the silica glass fiber core 100. This is due to the fact that the smart material can fill, or penetrate into, all the defects, pores, cracks, micro-cracks and voids that may exist or may be initiated in the fiber core 100. Additionally, the smart material of the present invention has an ability to absorb mechanical energy, which may be important in applications such as portable electronics, which are often subjected to mechanical shocks and vibrations.

A number of methods exist to manufacture the fiber core 100 with the nano-particle containing cladding layer 110 of the present invention.

One method may (1) electrically charge the surface of the glass fiber core 100 with static electricity.

The fiber core 100 may then (2) be exposed to an atmosphere saturated with nano-particles. Note that sedimentation of the nano-particles will occur, with the smaller diameter particles sedimenting out first, followed by a sedimenting out of a mixture of larger-diameter particles and small diameter particles. If different layers of different types of nano-particles are desired, this step may be repeated.

Then, for a short period of time, (3) an electrically conductive polymer, which contains acetic acid, is applied to the fiber.

Next, (4) a layer of smart material is applied to the surface of the polymer.

Next, (5) the entire structure, which is wetted by an electrically conductive polymer, is introduced into an alternating electromagnetic field (for example, RF/microwaves), in order to generate electrical currents inside the wetted polymer layer.

The generation of the electrical currents in the wetted polymer layer speeds up polymerization, as well as enhances water evaporation.

The process of inducing electrical currents inside the wetted polymer layer may be tailored so that its intensity correlates with the rate of the polymerization process, and the induced electrical currents drop to zero when full polymerization finally takes place.

It should be noted that when it is desirable to dispense with a filler material altogether, electrostatic adhesion might be used. In this case (using the two dissimilar nano-particle layers example, where the overall structure includes silica core/metallic oxide nano-particles/silica nano-particles, the silica core is charged negatively, the metallic oxide nano-particles in the inner cladding layer are charged positively, and the silica nano-particles in the outer cladding layer are charged negatively. Thus, without any requirement for a filler material, the overall fiber will be highly stable, since the static charge is trapped in the materials.

Furthermore, the manufacturing process may take place during the drawing of the optical fibers, or it may be conducted as a separate process. For example, with optical fiber interconnects, the manufacturing process can be easily modified to apply the smart material concurrently with the stripping-out of the polymer coating off the fiber (such as when splicing and connecting two fibers together).

The nano-particles themselves may be manufactured by any number of methods, such as grinding, or chemical methods.

In another preferred embodiment, the following steps for the manufacturing of the smart material may be followed:

(1) A 0.5–1.0% water-glycerin solution is prepared (alternatively, an alcohol or organic solvent polymer solutions or colloidal acetic acid-based raw polymer solution may be used). Glycerin, being a type of alcohol, easily dissolves in water, while at the same time acts as a bridging element to a hydrophobic surface. Also, alcohols are generally useful for this purpose, because they allow mixtures of materials that otherwise have difficulty mixing, to exist at least temporarily. Thus, any number of alcohols or spirits, for example, white spirit (turpentine), mixes of alcohol with organic solvents, for example, benzyl, acetone, etc. can be used to delay the development of hydrophobicity in the material of the cladding layer 110, until a particular manufacturing step is completed. Such solvents or their mix replace capillary water and may be removed from the fiber, along with residual moisture by azeotropic evaporation by high-frequency heating, for example. It is important to note that the medium is usually not entirely dry. A small water amount in the spaces of the highly disperse hydrophobic medium with the hydrophobic nano-particles is permitted. In this case, water is in the form small droplets, covered on their surface by a thin layer of hydrophobic nano-particles, and, therefore, cannot cause any harm to the silica glass. On the other hand, these droplets serve as elastic small balls, which provide an additional protection from external environmental hazards, particularly under elevated pressure. In this case, deformed water droplets surrounded by nano-particles block any possible paths to the glass, preventing any contact with the aggressive external environmental hazards.

(2) The hydrophobic nano-particles are then placed into the prepared water-glycerin solution, and are blended in a high-speed blender with a high vacation rate. This enables a creation of a highly heterogeneous water-air (water-glycerin-air) medium containing a desired density of nano-solids. A gas may also be used, instead of air.

(3) The fiber is then immersed in the water-air-glycerin solution, and remains there for about 20–40 seconds, to be exposed to the alcohol or organic solvent polymer solutions or colloidal water-glycerin-air solution containing the nano-particles.

(4) The wetted fiber is then exposed to microwave radiation. The water absorbs the microwave radiation, causing rapid azeotropic evaporation, in turn followed by an expulsion of the nano-particles out of the water and organic solvent, which will cluster on the glass surface. Such treatment provides a change of the elastic and optical properties of the foam and increases of the porosity of the foam on the surface of core. Nano-particles improve reflective properties and stability of foam, increasing its hardness. Elastic foam prevents or decreases a danger of impact failure. This process will create a polymer cladding on the structure that includes the fiber core and the nano-particle "solid layer" around it. The overall structure is therefore mechanically stable due to the glass core-nano-particles-polymer assembly. The combined effect of the polymeric film and the hydrophobic nano-particles also results in adequate environmental protection.

Another possible method of manufacturing includes forming a paste containing a polymer and the nano-particles, and drawing the fiber core through the paste such that the nano-particles stick to the surface of the fiber core.

It should be noted that liquid water generally cannot get through gaps or cracks that are smaller than 0.1 micron. Since the nano-particles, in the preferred embodiment, are substantially smaller than 0.1 micron, typically on the order of tens of nanometers, water particles are therefore unable to get through the gaps between the nano-particles, and the layer of nano-particles acts as a hydrophobic layer.

An additional advantage of the present invention is the extremely small diameter of the overall fiber structure. In typical fibers, the fiber core 100 itself is on the order of a few microns, typically about 5–8 microns in diameter, however, the cladding and the coating in conventional fibers is on the order of 125 microns in diameter. With the use of the materials and structure of the present invention, the overall diameter of the fiber may be substantially less than the typical 125 microns, down to as low as an order of magnitude, as low as 12–15 microns.

Figure 6:
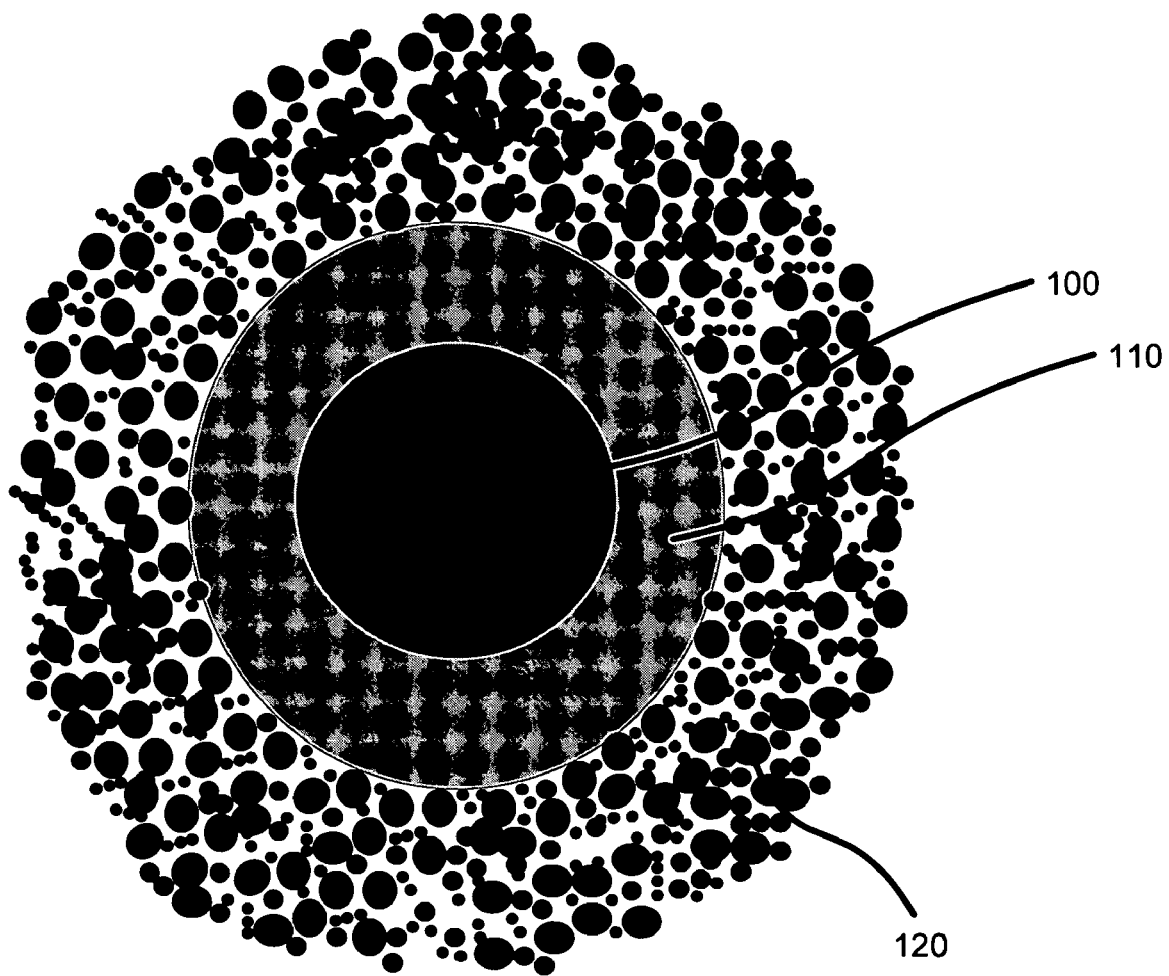
FIG. 6 shows the smart material used in the overclad layer.
Figure 7:
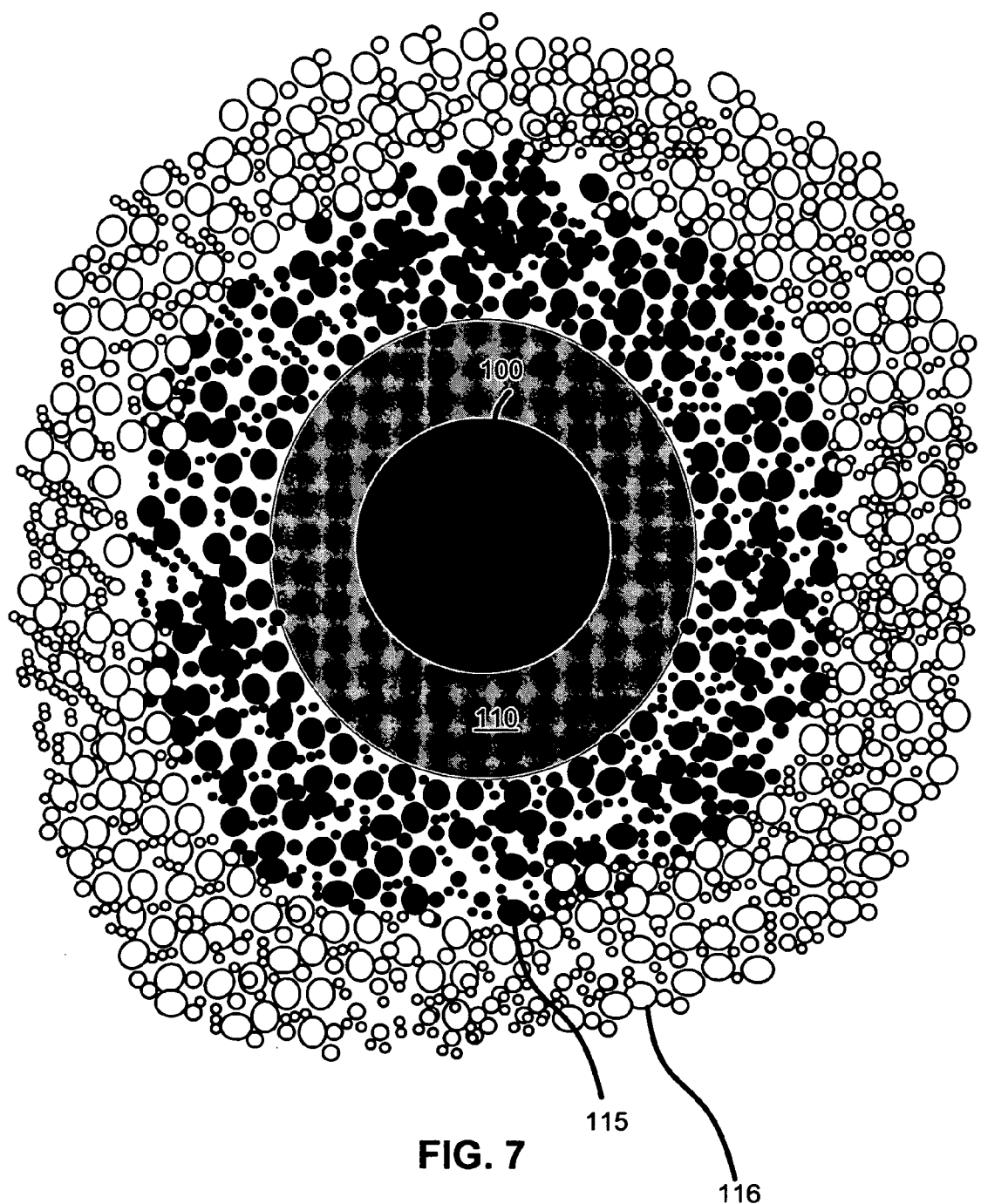
FIG. 7 shows the overclad layer comprising an inner hydrophilic nano-particle layer and an outer hydrophobic nano-particle layer.

Additionally, the very small diameter of the fiber that has a smart material cladding allows for a very low Young's modulus value of the overall fiber structure. Furthermore, many of the properties of the smart material can be very similar to glass silica, which is conventionally used in fiber optics. The smart material can be used not only as an alternative to existing coating and cladding materials, but can replace conventional silica cladding and "overclads" (see FIG. 6, showing the smart material used in the overclad, and FIG. 7, showing the overclad comprising an inner hydrophilic nano-particle layer 115 and an outer hydrophobic nano-particle layer 116, with the filler, which is optional, not shown in these figures). Due to a greater index of refraction difference between the fiber core 100 and the cladding layer 110, the attenuation of optical signal is reduced.

It will be appreciated that the technology discussed above is applicable not only to optical fibers, but also to other areas of photonics, for example, rectangular and planar waveguides deposited onto substrates.

Other applications include the use of fibers outside the optical industry, for example, the use of small-diameter fibers to reinforce structures, or for fiber-reinforced plastics.

Another application of the present invention relates to waveguides with high signal intensity and medium time resolution. For example, consider a thick optical fiber with a mirror coating that has close to 100% reflection up to angles of 25–30°. The critical angle for typical silica glass is about 41°. Thus, with the use of the smart materials of the present invention, transmitted signal intensity may increase by 10% to 30% due to improved optical propagation properties of the fiber.

It will be appreciated that the heterogeneous cladding layer 110 in FIG. 2 comprises nano-particles, as well as air or gas in the spaces between the nano-particles, along with a system-stabilizing component, which can be a polymer or a liquid (for example, poly-siloxane or silicon oils).

Due to the fact that the nano-particles and the fiber core 100 have negligible area of contact, from an optical point of view, the fiber core 100 is, for all practical purposes, in contact with the gas or air at its surface. Thus, the index of refraction seen by light propagating down the fiber core 100 in the cladding layer 110 is close to 1.0, in the case where a layer of nano-particles is used without any additional filler.

In another embodiment, the fiber core 100 or the silica nano-particles has a modified surface, such that methyl $CH_3$ groups are substituted for OH groups. This makes the surface of the silica hydrophobic. This modification of the silica surface addresses the possible issue of existing micro-cracks, because water vapor molecules cannot attach to the surface of the silica and therefore cannot initiate glass stress corrosion. The presence of water repellent nano-particles on the surface of the fiber core 100 provides an additional environmental and mechanical protection to the fiber, while at the same time creating appropriate conditions for propagation of light down the fiber core.

Figure 4:
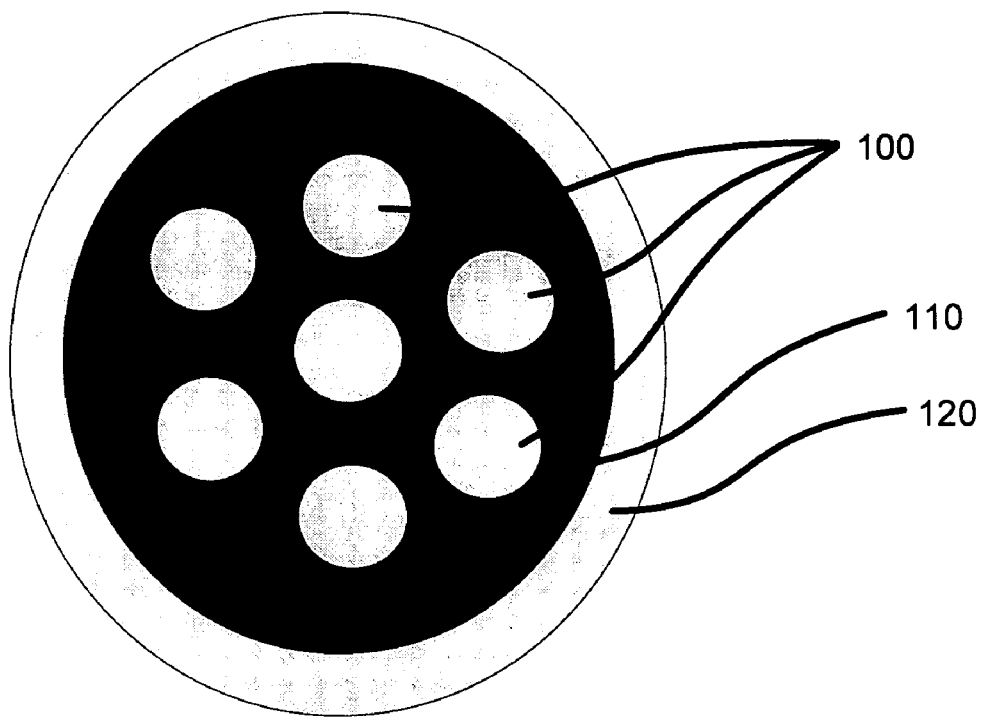
FIG. 4 illustrates yet another embodiment of the present invention with multiple fiber cores embedded in the same cladding-coating.

Another embodiment of the present invention is shown in FIG. 4. As illustrated in FIG. 4, a bundle of multiple fiber cores 100 may be embedded within the same filler material (cladding layer 110). The filler material is as described above, and may be a hydrophobic filler including nano-particles. An outer cladding layer 120 surrounds the filler layer. Due to the fact that each individual fiber core 100 is only a few microns in diameter, the overall structure may still have a small diameter, however, the presence of multiple fiber cores 100 within the same filler allows for a dramatic increase in total throughput capacity, without increasing the physical dimensions of the entire fiber structure. Additionally, the cores 100 in the multiple fiber core structure, which is illustrated in FIG. 4, need not be circular. For example, planar or rectangular cores (waveguides) may be deposited onto substrates, with nano-particle layers between them. Such waveguides can be rectangular or square, rather than circular.

While the invention has been described in detail and with reference to specific embodiments thereof, it will be apparent to those skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. An optical fiber comprising:
   a core;
   a cladding layer surrounding the core; and
   a thixotropic overclad layer surrounding the cladding layer,
   wherein the overclad layer includes a layer of hydrophilic nano-particles on the cladding layer, and a layer of hydrophobic particles on the layer of hydrophilic nano-particles.

2. The optical fiber of claim 1, wherein the nano-particles are embedded in a filler.

3. The optical fiber of claim 2, wherein the filler includes at least one of a polymer, synthetic oil, poly-siloxane and Teflon.

4. The optical fiber of claim 1, wherein the nano-particles include at least one of silica, molybdenum disulfide, Teflon and a metallic oxide.

5. The optical fiber of claim 4, wherein the metallic oxide is one of titanium oxide, aluminum oxide and magnesium oxide.

6. The optical fiber of claim 1, wherein the layer of hydrophilic nano-particles includes metallic oxide nano-particles and the layer of hydrophobic particles includes silica nano-particles.

7. The optical fiber of claim 1, wherein the layer of hydrophilic nano-particles includes molybdenum disulfide nano-particles and the layer of hydrophobic particles includes Teflon.

8. A method of manufacturing an optical fiber structure comprising the steps of:
   forming an optical fiber core;
   forming a cladding layer around the optical fiber core; and
   forming a thixotropic overclad layer around the cladding layer,
   wherein the step of forming the thixotropic overclad layer includes negatively charging the optical fiber core, positively charging the inner layer, and negatively charging the outer layer.

9. The method of claim 8, wherein the overclad layer is formed a plurality of nano-particles embedded in a filler.

10. The method of claim 8, wherein the overclad layer is formed having an inner layer of nano-particles, and an outer layer of nano-particles, the inner and outer layers having dissimilar hydrophobicity.

11. The method of claim 10, wherein the inner layer includes metallic oxide nano-particles, and the outer layer includes silica nano-particles.

12. The method of claim 9, wherein the step of forming the thixotropic overclad layer includes the step of immersing the optical fiber structure in a water-alcohol medium that includes the nano-particles.

13. The method of claim 9, wherein the step of forming the thixotropic overclad layer includes the steps of:
    applying a polymer with the nano-particles to the cladding layer; and
    drying the polymer.

* * * * *